United States Patent
Flett

[15] 3,689,087
[45] Sept. 5, 1972

[54] ACTUATOR ASSEMBLIES
[72] Inventor: Alexander Flett, London, England
[73] Assignee: Molins Machine Company Limited, London, England
[22] Filed: May 11, 1970
[21] Appl. No.: 36,114

[30] Foreign Application Priority Data
 May 14, 1969 Great Britain..........24632/69
[52] U.S. Cl. ....................................279/4, 90/11 A
[51] Int. Cl. ..............................................B23b 31/00
[58] Field of Search..........................279/4; 90/11 A

[56] References Cited
UNITED STATES PATENTS 3,544,120  12/1970  Stamm..........................279/4
3,096,988  7/1963  Skillin............................279/4
3,278,193  10/1966  Groner et al. ..................279/4

Primary Examiner—Andrew R. Juhasz
Assistant Examiner—Z. R. Bilinsky
Attorney—Markva & Smith

[57] ABSTRACT

A hydraulically operated actuator, such as an hydraulic chuck in a machine tool, is supplied with hydraulic fluid through the spindle on which it is carried and from a hydrostatic bearing mounting the spindle.

8 Claims, 2 Drawing Figures

Patented Sept. 5, 1972

3,689,087

Inventor
ALEXANDER FLEET
By
Lowry, Rinehart, Mackra & Smith
Attorneys

ACTUATOR ASSEMBLIES

The present invention relates to actuator assemblies and more particularly to chuck or collet assemblies in machine tools. The invention is especially useful in a machine tool of the kind disclosed in U.S. Pat. Nos. 3,241,451 issued Mar. 22, 1966. Re.25,956 issued Feb. 22, 1966 which has twin spindles, each adapted to carry a tool, which are rotatably mounted in hydrostatic bearings.

In such a machine the following considerations apply:

a. The chuck or collet often needs a large gripping force to counteract the cutting loads and centrifugal forces.
b. Springs are commonly used to provide this gripping force for automatic operation, but need a large space which is not always available. Hydraulic or pneumatic means are then used to open the chuck while the spindle is stopped.
c. Hydraulic means of gripping are not often used because high pressure sealing must be provided on the rotating shaft. These create undesirable heat, and are also liable to fail in which event the grip would be released and a serious accident ensue.

The present invention allows hydraulic gripping means to be employed with high reliability, although it is not limited to use in the above environment.

According to the present invention there is provided an actuator assembly comprising an actuator rotatably supported by a hydrostatic bearing and wherein the actuator is actuated hydraulically by pressurized fluid supplied from the hydrostatic bearing.

Figure 1:
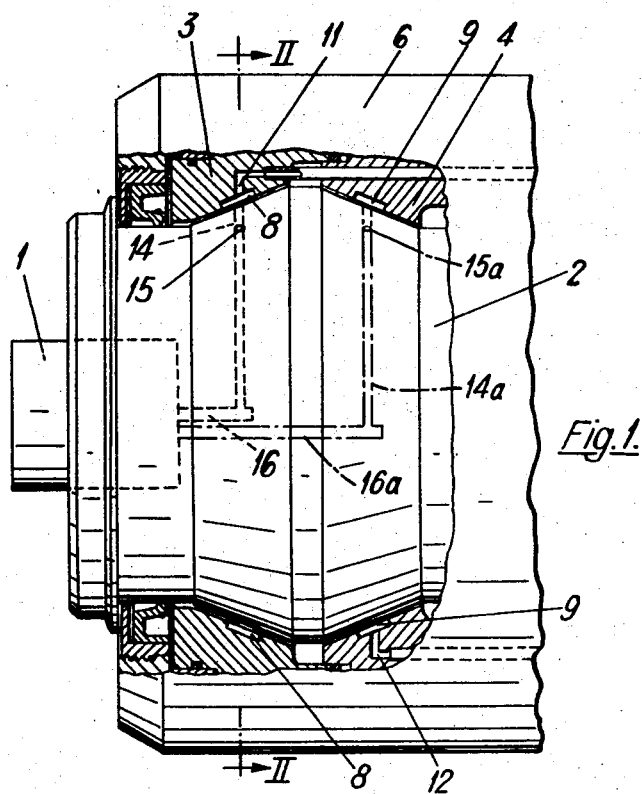
Figure 2:
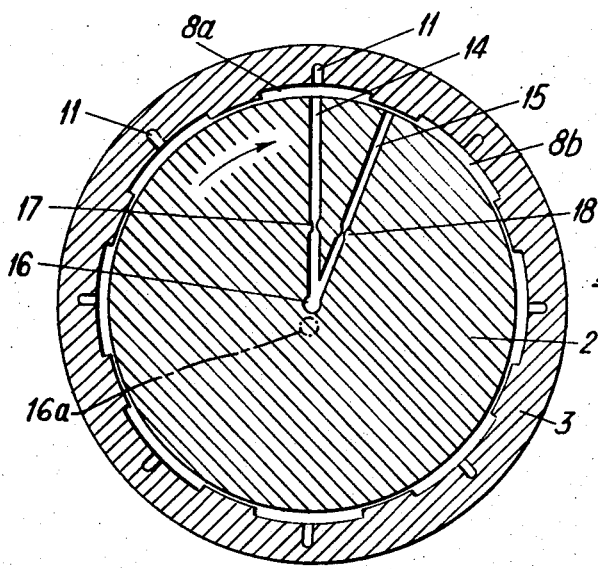

How the invention may be carried out will now be described with reference to the accompanying drawings in which:

FIG. 1 is a fragmentary part-section elevational view of a chuck assembly according to the present invention; and FIG. 2 is a sectional view of part of the assembly on the line II—II of FIG. 1.

An assembly comprises a chuck 1 mounted at the free end of a spindle 2 which is rotatable within two hydrostatic bearings 3 and 4 carried in a housing 6. At its right-hand end the spindle 2 is provided with a further similar hydrostatic bearing (not shown).

The chuck is provided in a machine tool such as that described in the patent referred to above, the chuck being used to grip a cutting tool or a workpiece.

The bearings 3 and 4 have pads 8 and 9 respectively to which hydraulic bearing fluid is supplied under pressure from passages 11 and 12 respectively.

The spindle 2 has a pair of radially extending passages 14 and 15 which both communicate at their radially inner ends with an axially extending passage 16 in the spindle. The two radial passages 14 and 15 are angularly spaced from one another by an angle A such that at any time, during the rotation of the spindle 2, at least one of the passages 14 or 15 is in communication with a pad 8 of the bearing 3 to supply hydraulic fluid to the axial passage 16. Thus, in FIG. 2 when the radial passage 14 is in register with the pad 8a, the radially outer end of the radial passage 15 is substantially blocked by the housing 6 but as the passage 14 moves out of register with the pad 8a the passage 15 moves into register with the pad 8b. Consequently the axial passage 16 is supplied with pressurized hydrostatic fluid for all angular positions of the spindle 2.

The chuck 1 is any suitable hydraulically actuated chuck. An example of a hydraulically-actuated chuck is disclosed in U.S. Pat. No. 3,240,503 issued Mar. 15, 1966. The hydraulic pressure supplied to the chuck through the passage 16 is used to actuate the tool gripping mechanism.

In a further embodiment of the invention a second source of hydraulic pressure is applied to the chuck from the other hydrostatic bearing 4 to either hold the chuck closed around the tool or to open the chuck respectively. This second source is taken from the pads 9 of the bearing 4. Passages 14a, 15a and 16a similar to the passages 14, 15 and 16 respectively, and shown in FIG. 1 chain-dotted, allow the second source of hydraulic pressure to be supplied from the pads 9 to the chuck.

Alternatively the second source of hydraulic pressure could be taken from pads (not shown) of the further hydrostatic bearing at the right-hand end of the spindle 2 referred to above.

The passages 14 and 15 have restrictions 17 and 18 respectively in them so that when the radially outer end of the passages 14 and 15 are each in register with a different pad 8 there will be no substantial flow of hydraulic fluid through that passage from one pad to the other.

In some bearings, the pressure and flow capacity from the land between pockets may be adequate to operate the actuator. In such a case, a single radial passage 14 would suffice and the restrictor 17 would not be needed although again in some cases, where the journal load on the bearing causes a large pressure change from one side of the bearing to the other, a restrictor 17 may be necessary to smooth out the pressure pulsations at the actuator which would occur as the spindle rotates.

Depending on the particular bearing and the nature of the load it carries, where multiple passages 14 and 15 are used, these may be spaced to span one intermediate land as described above, so that during the changeover, they communicate with adjacent pockets. However, alternatively they may be spaced so that they communicate with pockets on opposite sides of the bearing or with any pair of pockets on the bearing or even with pockets on different bearings. Where space is available it may be more convenient to provide a special annular pocket adjacent to the bearings with a drainage groove on both sides, connected to the bearing drain passages. A single passageway would carry the feed from this groove to the actuator. This would be particularly important where the actuator needed a larger supply than the bearing could cope with.

I claim:

1. An actuator assembly for a machine tool comprising a hydraulically actuated chuck carried by a spindle which is rotatably mounted in at least one hydrostatic bearing, the bearing having a plurality of recesses circumferentially spaced around the spindle, an axial passage in the spindle extending at one end to the chuck and at its other end to at least two radial passages which are in the plane of the bearing and communicate with the outer surface of the spindle, each radial passage having a flow restrictor therein and being angularly spaced from each other such that at any time at least one of them is in communication with a recess, whereby upon rotation of the spindle pressurized fluid is supplied by each recess in turn through the radial and axial passages to actuate the chuck.

2. An actuator as claimed in claim 1 in which there are two hydrostatic bearings each associated with separate radial and axial passages communicating with the chuck, whereby pressurized fluid from one of the bearings acts to close the chuck and from the other bearing acts to open the chuck.

3. An actuator assembly for a machine tool comprising
  a. a hydraulically actuated chuck,
  b. a spindle supporting said chuck, and
  c. at least one hydrostatic bearing having a bore therein for rotatably supporting said spindle, the interior surface of said bore including a plurality of circumferentially spaced recesses, and
  d. said spindle including passage means extending between said chuck and a set of at least two ports in the external surface of the spindle in a plane defined by said recesses in a bearing, said ports being spaced from each other about said spindle such that at any instance at least one port is in communication with a recess,
  e. whereby upon rotation of the spindle pressurized fluid is supplied by each recess in turn through said ports and passage means to actuate said chuck.

4. An actuator as claimed in claim 3 wherein said passage means comprises a passage extending substantially radially between each of said ports and a common point internally of said spindle and a further passage extending in substantially an axial direction between said common point and said chuck.

5. An actuator as claimed in claim 4 wherein said radial passages each include a flow restrictor therein.

6. An actuator as claimed in claim 3 wherein the spacing between adjacent ports about said spindle is greater than the spacing between adjacent recesses about the bore in said bearing.

7. An actuator as claimed in claim 3 wherein said recesses in said bore are separated from each other by lands, the angular spacing between adjacent ports being greater than the length of any one of said lands.

8. An actuator as claimed in claim 3 comprising two of said hydrostatic bearings, two sets of said ports and separate passage means extending between each set of said ports and said chuck, whereby pressurized fluid from one of the bearings acts to close the chuck and from the other bearing acts to open the chuck.

* * * * *